United States Patent [19]

McCorquodale

[11] Patent Number: 4,604,215

[45] Date of Patent: Aug. 5, 1986

[54] WET OXIDATION SYSTEM

[75] Inventor: Robert P. McCorquodale, West Hill, Canada

[73] Assignee: Kenox Corporation, Toronto, Canada

[21] Appl. No.: 595,821

[22] Filed: Apr. 2, 1984

[51] Int. Cl.$^4$ .............................................. C02F 11/08
[52] U.S. Cl. .................................................. 210/762
[58] Field of Search .............................. 210/761–763, 210/748, 151, 150

[56] References Cited

U.S. PATENT DOCUMENTS

| | | | |
|---|---|---|---|
| 3,870,631 | 3/1975 | Fassell et al. | 210/762 |
| 3,917,811 | 11/1975 | Grout et al. | 210/763 X |
| 4,141,828 | 2/1979 | Okada et al. | 210/762 |
| 4,155,848 | 5/1979 | Sato et al. | 210/761 |
| 4,203,838 | 5/1980 | Shimizu et al. | 210/761 X |

Primary Examiner—Thomas Wyse
Attorney, Agent, or Firm—Sim & McBurney

[57] ABSTRACT

A process for oxidizing an aqueous suspension of organic matter at elevated temperature and pressure includes exposing the organic matter to an oxygen-containing gas in a reactor for a period sufficient to reduce chemical oxygen demand of the organic matter to a predetermined desired level. An aqueous suspension of organic matter and bubbles of oxygen containing gas is split, rearranged and combined by an arrangement of vanes within the reactor core.

16 Claims, 3 Drawing Figures

4,604,215

WET OXIDATION SYSTEM

FIELD OF THE INVENTION

This invention relates to process and apparatus for the wet oxidation of organic matter using oxygen-containing gases such as air.

BACKGROUND OF THE INVENTION

Destructive oxidation of organic materials in an aqueous medium has been employed because it provides a useful process for reducing the chemical oxygen demand of organics in water systems. This avoids the need to de-water the system in order to burn in a fuel system the organics. British Pat. No. 706,686 discloses a self-sustaining process for the destructive oxidation of organic materials in an aqueous medium. The system operates at a temperature above 450° F. and a pressure sufficient to maintain the water in liquid form so as to cause the organic material to be oxidized. Such pressures may be in the range of 1400 to 1500 pounds per square inch and the temperatures may be as high as 625° F.

Catalysts have been used in the system to catalyze the oxidation reaction, such as disclosed in U.S. Pat. No. 2,690,425. The system is operated at temperatures in the range of 100° C. to 350° C. under pressures of between 400 to 2500 pounds per square inch.

The reactor design for the wet oxidation system has been provided in many forms, such as disclosed in U.S. Pat. No. 3,870,631. The reactor is horizontally oriented and has several compartments to provide a series reactor arrangement. Agitators are used to provide a rubbing or abrasive contact between the combustible organic matter and the oxygen over a maximum area by reason of the high state of movement during agitation by the agitators. The agitators are power intensive in view of the speeds at which they must rotate to generate the degree of agitation required in the wet oxidation process of that patent, e.g. they may be rotated at speeds of 1300 rpm.

Another approach in agitating a liquid system is to use ultrasonic energy as disclosed in U.S. Pat. No. 4,013,552. Ultrasonic energy is transmitted to sewage which is at standard temperature and pressure. This treatment reduces the liquid particle size and enrobes the reduced water particles with air to enhance the biochemical oxidation by the aerobic bacteria. However, this patent does not contemplate the use of ultrasonic energy in the chemical oxidation of organic matter. Although U.S. Pat. No. 4,003,832 discloses the use of ultrasonic energy in chemical oxidation of organic matter, this patent requires the use of large concentrations of ozone in the area of the ultrasonic energy generator.

U.S. Pat. No. 4,155,848 discloses a vertical reactor tower for use in the wet oxidation of organic matter. The vertical tower has an outer cyclindrical vessel with a smaller diameter concentric tube therein. The introduced organic matter and oxygen are circulated downwardly of the annular portion of the vessel and upwardly of the interior of the reactor core. The oxygen is introduced into the base of the inner tube so that in flowing upwardly it causes a circulation of the aqueous medium in the system. This requires considerably increased supply of compressed air to cause the necessary circulation. The process, therefore, become cost ineffective because of the high capital and energy intensive system needed to compress this air. The system is normally operated at temperatures in the range of 250° C. to 374° C. The pressure is high enough to maintain the effluent in liquid phase.

SUMMARY OF THE INVENTION

According to an aspect of the invention, the process for oxidizing an aqueous suspension of organic matter in reducing the chemical oxygen demand of the organic matter to a predetermined level is carried out at an elevated temperature and pressure by exposing the organic matter to an oxygen containing gas for a sufficient period of time.

The process is carried out in a reactor having a reaction zone consisting of a static mixer vane arrangement and means for circulating the aqueous suspension of organic matter through the static mixer vane arrangement. The process comprises operating the reactor at the elevated temperature and pressure which promotes the oxidation in the aqueous medium of organic matter with minimal generation of steam. An oxygen containing gas is introduced into the aqueous suspension of organic matter. The aqueous suspension of organic matter and bubbles of oxygen containing gas are split, rearranged and combined in the static mixer as they are circulated through the static mixer by the circulating means to react the organic matter with the oxygen. The treated organic matter is withdrawn from the reactor reducing the chemical oxygen demand to the predetermined desired level.

According to another aspect of the invention, the apparatus having the reaction zone consists of the static mixer vane arrangement with the means for circulating the aqueous suspension of organic matter through the static mixer vane arrangement. Means is provided for introducing an oxygen containing gas into the reactor and means for introducing an aqueous suspension of organic matter into an area of the reactor separate from where the oxygen containing is introduced. The static mixer comprises a plurality of vanes arranged within the reaction zone to split, rearrange and combine the aqueous suspension of organic matter and oxygen containing gas bubbles. Means is provided for withdrawing treated organic matter in aqueous suspension and gases from the reactor.

According to another aspect of the invention, ultrasonic energy waves may be used in the reactor to further enhance the oxidation reaction by breaking up already partly oxidized organic matter. In addition, the static mixer vanes may have at least portions thereof coated with a catalyst for the oxidation reaction.

BRIEF DESCRIPTION OF THE DRAWINGS

Preferred embodiments of the invention are shown in the drawings wherein.

DETAILED DESCRIPTION OF THE PREFERRED EMBODIMENTS

The process and apparatus, according to this invention, is useful in most wet oxidation applications such as in the disposal of sewage, slime, sludges and other organic waste including organic plastics and explosives. The oxidative combustion is controlled, as carried out under water, where the pressure is sufficient to minimize the production of steam during the reaction. By use of the static mixer vane arrangement in the reactor core, the overall reactor configuration is considerably simplified compared to the power intensive type such as disclosed in U.S. Pat. No. 3,870,631.

Figure 1:
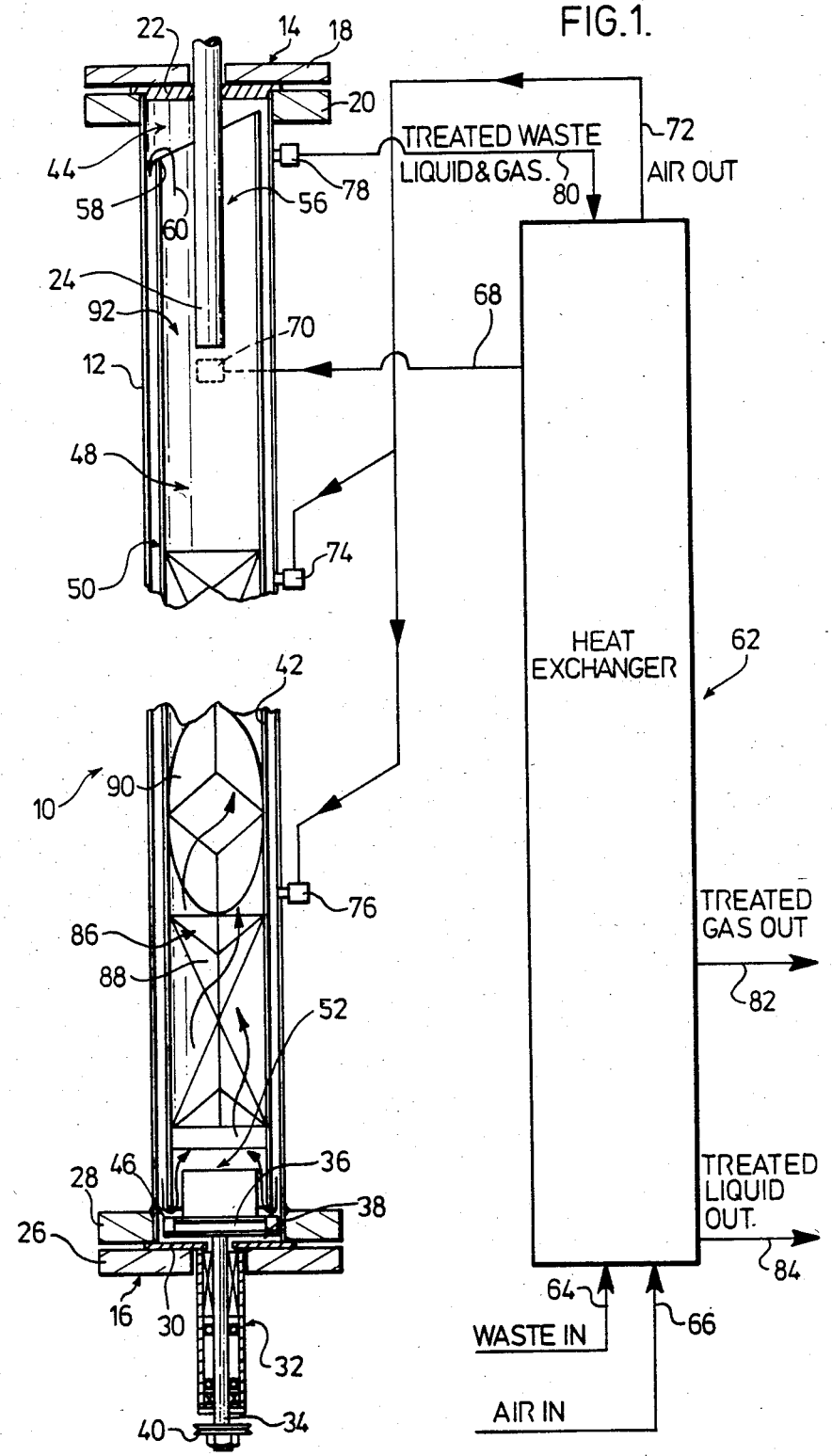
FIG. 1 is a schematic view of the reactor and heat exchanger for use in the wet oxidation of organic matter and in which the process, according to this invention, is carried out.

Considering the process as carried out in a preferred embodiment for the apparatus of FIG. 1, a vertically oriented reactor 10 comprises an outer cylindrical pressure vessel 12 with closed upper and bottom end portions 14 and 16. According to this construction, the upper end 14 comprises an outer plate 18 bolted to an annular ring 20 which is welded to the outer pressure vessel 12. Sealing material 22 is used in sealingly engaging the outer plate 18 to the annular ring 20. An ultrasonic probe 24 extends through the plate 14 and is sealingly engaged with the gasket material 22 as it extends into the reactor 10.

The bottom 16 is similarly sealed with an outer plate 26 bolted to an annular ring 28 which is welded to the outer vessel 12. A gasket 30 is used in sealingly engaging the outer plate 26 with the vessel 12. A bearing and sealing arrangement 32 is provided for the drive shaft 34 which drives the vanes 36 of the pump unit 38 which, according to this embodiment, is located at the bottom portion of the reactor 13. The seals and bearing arrangement 32 is such to withstand the temperatures and pressures at which the reactor 10 operates. A pulley 40 is provided on the drive shaft which is connected by way of appropriate V-belt to a drive motor. The reactor 10 includes, interior and concentric with the cyclindrical outer pressure vessel 12, an inner tube 42. The inner tube is shorter than the outer vessel 12 to define an upper space 44 and a lower space 46, thereby providing communication between the reactor core 48 defined in the interior of the inner tube 42 and the outer annular reactor chamber 50 which surrounds the reactor core.

The circulating pump 38 is located in the lower region 46 with the vanes 36 extending upwardly into the interior portion 52 of the inner tube 42. The vanes are so configured to circulate the aqueous suspension and gases upwardly of the inner core in the direction of arrows 54. As the suspension and gases emerge from the upper region 56 of the reactor, they flow over the rear portion 58 of the inner tube in the direction of arrow 60, thus flowing downwardly for recirculation upwardly of the inner core in the direction of arrow 54.

On start-up of the reactor 10, it is heated to the operating temperatures and pressurized to the operating pressures. In order to treat common industrial wastes, the operating temperatures are normally in the range of 200° C. to 230° C. and pressures in the range of 35 to 45 kg/cm$^2$. However in treating waste from oil recovery systems to thereby generate energy, the systems may operate at pressures in the range of 210 kg/cm$^2$ and temperatures in the range of 320° C. in treating waste from heavy oil and tar sands bitumen recovery systems. The outer vessel 12 is reinforced and made of a material which can withstand the operating pressures and temperatures with added safety margin. Normally the reactor 10 is elevated to the operating temperature by purging the system with live steam and then pressurized as the high pressure aqueous waste stream and oxygen-containing gas are introduced to the reactor. A heat exchanger 62 is used to heat exchange the hot treated waste liquid and gases with incoming waste materials and the oxygen-containing gas which may be air. The waste to be treated is introduced to the heat exchanger 62 via line 64. The air is introduced to the heat exchanger via line 66 which flows upwardly of the heat exchanger. The heated waste stream emerges from the heat exchanger in line 68 and is introduced to the outer reactor chamber 50 via inlet 70 at the rear of the reactor 10. The inlet 70 has a nozzle portion which directs the introduction of the waste stream circumferentially of the annular chamber 50 so that the aqueous suspension circulates downwardly of the outer chamber 50 in a spiral manner.

The heated air exits the heat exchanger in line 72 and is introduced at the first location by inlet 74 for mixing with the downwardly travelling aqueous suspension. Optionally, there may be a second inlet 76 for introducing additional fresh oxygen-containing gas to the outer chamber 50 further downstream of the inlet 74.

The treated waste liquid and gases are removed from the upper region 44 of the reactor via outlet 78 which passes the treated liquid and gases downwardly of the heat exchanged via line 80. The hot waste liquid and gases are heat exchanged with the incoming untreated waste stream and air. As the waste liquid and gas is cooled, the gases separate and exit from the heat exchanger via line 82. The condensed liquids emerge from the heat exchanger via line 84.

The reactor core 48 includes a static mixer vane arrangement 86 which is secured and remains stationary within the inner tube 42. The circulating pump 38 circulates upwardly the aqueous suspension and gases over the vanes 88 and 90 of the static mixer. The vanes are shaped and configured as shown by the different arrangements of 88 and 90 to split, rearrange and combine the stream. The flow rates upwardly of the reactor core are such that the organic matter and bubbles of oxygen-containing gas, which may be air, are subdivided so as to expose fresh surfaces of the organic matter to oxygen and further oxidize the organic compounds. The static mixer vane arrangement extends from the lower region of the inner tube upwardly of a majority of the inner tube. Above the static mixer is the upper region 92 which is left vacant.

According to a preferred embodiment of the invention, an ultrasonic probe 24 is located in the upper region 92. By way of the ultrasonic energy, the already oxidized particles of organic matter are further broken up to expose fresh surfaces which are oxidized by the bubbles of air. The air bubbles may be imploded by the ultrasonic energy to expose more oxygen to the fresh organic surfaces in enhancing the oxidation of the organic matter.

The upper end of the inner tube is sloped to provide a lowermost portion which defines the weir 58. Thus the treated materials flow over the weir in a direction away from the outlet 78 to enhance the circulation of the materials. The liquid level in the reactor may be slightly above the outlet 78 so that the treated organic matter and entrained gases are removed. Above the outlet, there is the upper space 44 where some gases may remain, but principally in all reaction zones within the outer chamber 50, the inner core along the static mixer and at the ultrasonic probe, there are no vapour regions.

Thus the reactor 10 provides, according to this preferred embodiment, three reaction zones. A first reaction zone is provided in the outer core 50 where the introduced untreated organic matter is exposed to oxygen at inlets 74 and 76 for the incoming fresh air. The second reaction zone is defined in the static mixer 86 along its length whereby additional splitting and refolding of the materials, further oxidation of the organic matter takes place. The third reaction zone is in the region of the ultrasonic probe 24 which breaks up the remaining oxidized organic matter, particularly the small organic molecules, to further oxidize the materials to the extent in forming carbon dioxide and carbon monoxide. It has been found that produced acetic acid, which is most difficult to break down in other types of prior wet oxidation systems, can be broken down by this system.

Violent agitation of the system is avoided in each of the reaction zones. The circulating pump 38 merely circulates the fluid downwardly of the outer annular reactor chamber 50 and upwardly over the static mixer vanes 86. There is no violent agitation in the area of the pump 38 and the air, as introduced, is at spaces remote from the vanes of the pump 38.

The static mixer may have a variety of vane configurations which are readily available in the marketplace. For example, the "Statiflo" (trademark) motionless mixers as distributed by Statiflo Inc. provide an acceptable static mixer. Another example is the static mixer distributed by Koch Engineering Company Inc. Additional details of static mixers and their applications may be found in International Chemical Engineering, Volume 22, No. 2, April 1982, 1977.

By use of the static mixer, the mixing of the components is accomplished with a minimum of power input, approximately one tenth of that required to operate the agitating devices of other units and achieve adequate mixing to oxidize extensively the materials.

The use of a motionless mixer providing extended surface area along its length lends itself readily to the use of catalysts for the oxidation reaction. The surface of the vanes of the static mixer can be formed of or include catalysts which, at these temperatures and pressure, catalyze the oxidation reaction. Suitable catalysts are metallic oxides of copper, nickel, cobalt, chromium, manganese, platinum, palladium, iron, cerium or silver. Mixtures of such oxides are useful, such as copper oxide/zinc oxide (50:50), copper oxide/chromium oxide/magnesium chromate (1:1:.004 by weight) and nickel oxide/nickel chromate (50:50). Other catalysts include magnesium sulphate and ammonium vanadate. Another catalyst mixture includes manganese/chromium/zinc (80/47/20).

The dimensions of the inner tube and the outer vessel are selected such that with the particular circulation rate of the pump 38, the flow of the aqueous suspension downwardly of the outer annular chamber is increased relative to the upward flow through the static mixer. This increased flow down the outer reaction chamber ensures that the oxygen-containing gas, as introduced at points 74 and 76, is entrained in the suspension and moves downwardly with the aqueous suspension so as to be present in the suspension when travelling upwardly through the static mixer.

According to a preferred embodiment of the invention in treating normal organic industrial waste, the dimensions of the inner tube to the outer tube provides volume ratios in the range of 2:1.

Because of the unique reactor design, there is considerably lower capital costs in equipment as compared to other arrangements, higher yields are realized in chemical oxygen demand reduction compared to other reactor designs. The arrangement, according to this invention, involves fewer valves and control equipment. The modular approach to the reactor provides for multiples thereof in providing series reactors. In arranging for a series of reactors, the treated waste liquid and gas in line 80 would be introduced to a downstream reactor corresponding to reactor 10 at inlet 70. Air would be introduced to the downstream reactor again at point 74 and 76. A plurality of reactors may be so arranged where the treated waste liquid from each reactor is transferred to the next. The treated waste liquid and gas removed from the last reactor in the series would then be returned through the heat exchanger. Multiples of reactors may be used in the circumstances where extended oxidation reactions are required to fully reduce the chemical oxygen demand in the introduced waste liquid.

The use of ultrasonic energy in association with a multiple reactor system provides additional benefits. The use of the ultrasonic energy to break up the organic matter, as it emerges from the static mixer reactor zone, provides fresh surfaces for oxidation which when transferred to the downstream reactor, is contacted with fresh oxygen containing gas to expedite the oxidation of the broken up organic materials in the downstream reactor. It is appreciated that a wide range of ultrasonic frequencies may be used, such as from 10 kilohertz to 100 kilohertz.

The apparatus may be operated on either a batch or continuous basis. For a batch basis, the reactor 10 is initially heated to the operating temperature by use of live steam which may be introduced via inlet 70 and removed via outlet 78. Once the reactor is up to operating temperature, the aqueous suspension of organic matter is introduced via inlet 70 at the operating pressure until the predetermined batch volume of aqueous suspension is introduced to the reactor. The heated air is introduced at operating temperature and pressure via inlets 74 and 76 to commence the oxidation of the organic matter. The air is continuously introduced during the operation of the apparatus until the chemical oxygen demand of the organic matter is reduced to a desired level. At that time, the reactor is purged of the treated material in preparation for treating the next batch or shutdown.

When the reactor 10 is operated on a continuous basis, the aqueous suspension of organic matter and oxygen-containing gas are introduced at rates which provide a residence time for the organic matter in the reactor to reduce the COD (chemical oxygen demand) to the desired level. The treated waste liquid and gases are continuously removed from outlet 78 in the manner previously discussed.

Figure 3:
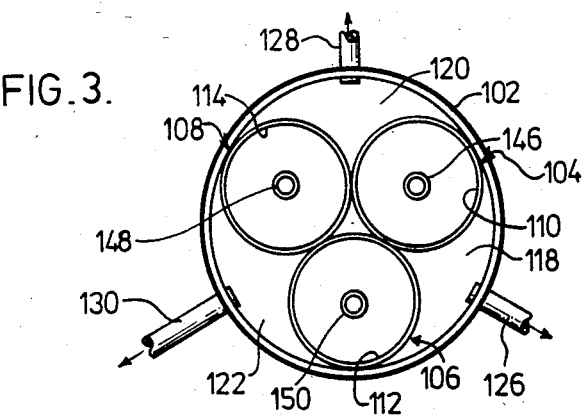
FIG. 3 is a section along lines 3—3 of FIG. 2.
Figure 2:
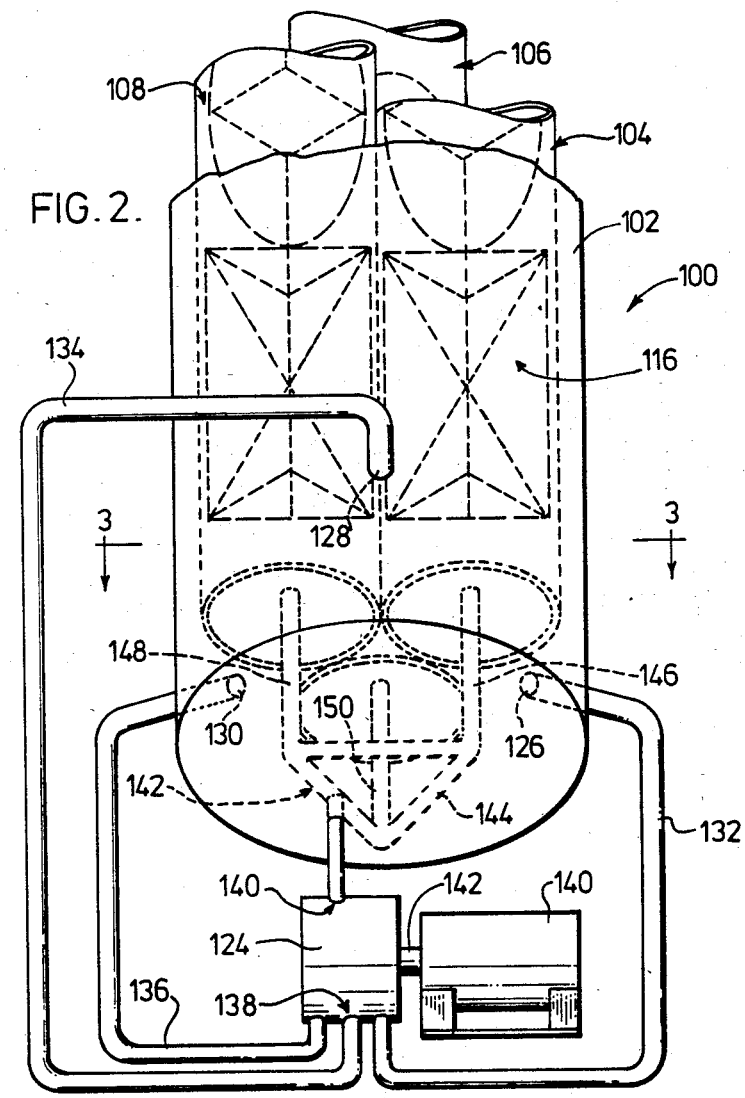
FIG. 2 is a schematic view of an alternative embodiment of the reactor having a plurality of reaction zones defined therein in which the process, according to this invention, is carried out.

The alternative embodiment for the reactor design is schematically shown in FIG. 2. The reactor 100 comprises an outer shell 102 only the lower section of which is shown. In view of the prior discussion of the complete reactor of FIG. 1, the upper portion would be similar with respect to the location of means for withdrawing treated organic matter from the upper region of the reactor along with location of an ultrasonic probe above the reactor cores 104, 106 and 108 which are positioned within the reactor shell 102 as shown in the section of FIG. 3. The reactor tubes 104, 106 and 108 are very similar to the reactor tube of FIG. 1. By providing a multiplicity of the reactor tubes in the reactor 100, variations on the circulation can be achieved employing a pump which may be located either internally or externally of the reactor 100. Each reactor tube 104, 106 and 108 has corresponding tubular wall portions 110, 112 and 114. A static mixer vane arrangement generally indicated at 116 in tube 104 is located in each of the tubes to define a corresponding reaction zone. The aqueous suspension of organic matter and oxygen-containing gas are introduced to the reactor 100 in a manner similar to that with the reactor 10 of FIG. 1. The flow of the material, according to this embodiment, is upwardly of each of the reactor cores 104, 106 and 108. By arranging the reactor cores contiguous one another and surrounded by the reactor shell 102, three discrete and independent channels 118, 120 and 122 are provided. The material overflows these tubes and flows downwardly of the reactor via the channels 118, 120 and 122. This circulation is induced by pump 124 which removes the downwardly flowing organic material in suspension via the respective outlets 126, 128 and 130. The outlets, in communication with conduits 132, 134 and 136, transfer the materials to the inlet side 138 of the pump 124. The pump 124 is driven by motor 140 connected by a drive shaft 142. The pump has a single outlet 140 which is connected to a manifold 142 consisting of a cage network 144 which divides the output of 140 into three outlet portions 146, 148 and 150. The outlet portions extend into the respective tubes as shown in FIG. 3. By circulating pump 124 located exterior of the reactor 100, a circulation of the aqueous suspension of organic matter and oxygen-containing gas is achieved without violent agitation at the base of the reactor 100. Depending upon whether the reactor 100 is operated on a batch or continuous basis, the flows are prescribed so as to provide the necessary residence time of the organic matter in the reactor 100 to achieve the desired reduction in chemical oxygen demand of the materials being treated.

As with the static mixer vane arrangement of the reactor of FIG. 1, the static mixer vane 116 in each reactor tube may be coated with suitable catalysts for the oxidation reaction. An ultrasonic probe may be located above the grouping of three reactor tubes in the upper region of the reactor or a probe provided for each of the tubes similar to the manner shown in FIG. 1. It is understood in keeping with the alternative embodiment of FIG. 2 that many other configurations internally of the reactor may be provided to achieve a plurality of reaction zones effected by the static mixer vane arrangements.

The process of the invention has been carried out in the reactor design of FIG. 1 having two towers in series using a sugar water test stream having a 7% COD. The reactor system was operated on a continuous basis with a reactant residence time of one hour. Samples of treated oxidized stream were collected. The collected samples were analyzed to reveal at steady state condition a COD reduction of 91%. With the ultrasonic probe activated, a further 5% reduction of COD was achieved to realize an overall COD reduction of 96% during steady condition. It is appreciated that the use of an appropriate catalyst of the type previously discussed would further increase the overall percentage COD reduction.

The apparatus and process of this invention is capable of operating at the reduced temperatures and pressures for a wet oxidation system as compared to the substantially higher temperatures and pressures used in many of the prior art systems. In view of the unique aspects of the reactor, the system is considerably more economic and compared to some systems will cost one third of the prior systems. By using the modular concept for the reactors, larger volumes of waste material can be processed by simply adding more units to the system. The modules can be inventoried, thereby shortening delivery time. Heat exchange within the reactor is facilitated by the design of having an inner reactor core surrounded by an outer reactor chamber. The downflow section of the reactor removes heat from the energy created in the upflowing material of the central core. Thus less demand is placed on the heat exchanger in heating the waste materials to be introduced to the reactor. The circulation pump for use in circulating the aqueous medium requires about 10% of the power required to drive the agitators of the more complex, multi-chamber systems, such as disclosed in U.S. Pat. No. 3,870,631.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A process for oxidizing an aqueous suspension of organic matter at elevated temperature and pressure by exposing the organic matter to an oxygen-containing gas in a reactor for a period sufficient to reduce chemical oxygen demand of the organic matter to a predetermined desired level, said reactor having a reactor core housing a static mixer vane arrangement and means for circulating said aqueous suspension of organic matter over said static mixer vane arrangement within said reactor core, said static mixer vane arrangement comprising an arrangement of vanes extending along a majority of and within said reactor core, said process comprising operating said reactor at said elevated temperature and pressure which promotes the oxidation in the aqueous medium of organic matter with minimal generation of steam, introducing an oxygen-containing gas into said aqueous suspension of organic matter; splitting, rearranging and combining the aqueous suspension of organic matter and bubbles of oxygen-containing gas by the aqueous suspension of organic matter and bubbles of oxygen containing gas over said arrangement of vanes within said reactor core to react said organic matter with said oxygen; withdrawing treated organic matter from said reactor.

2. A process of claim 1, wherein a plurality of said reactor cores are provided within said reactor, circulating said aqueous suspension of organic matter through said reactor cores.

3. A process of claim 2, wherein said reactor cores extend generally parallel with one another within said reactor, returning said aqueous suspension along the reactor cores' exterior for recirculation through said reactor cores.

4. A process of claim 3, wherein said circulating means is located at one end of the cores for returning said aqueous suspension along the reactor cores' exterior.

5. A process of claim 1, wherein said aqueous suspension of organic matter is withdrawn from said reactor after passage through said reactor core, passing said withdrawn aqueous suspension through said circulating means located outside of said reactor and returning said aqueous suspension from said circulating means to said reactor core for recirculation therethrough.

6. A process for oxidizing an aqueous suspension of organic matter at elevated temperature and pressure by exposing the organic matter to an oxygen-containing gas in a reactor for a period sufficient to reduce chemical oxygen demand of the organic matter to a predetermined desired level, said reactor being vertically oriented and having an inner reactor core separated from and surrounded by an outer reactor chamber where said reactor core communicates at its upper and lower regions with said outer reactor chamber, said process comprising operating said reactor at said elevated temperature and pressure which promotes the oxidation in the aqueous medium of organic matter with minimal generation of steam, by means of a pump located in the region of the lower end of said reactor core circulating continuously said aqueous suspension and oxygen-containing gas downwardly of said outer reactor chamber and upwardly of said reactor core, introducing separately an aqueous suspension of untreated organic matter and an oxygen-containing gas into the upper region of said outer reactor chamber and below said reactor core upper region, said untreated organic matter and oxygen-containing gas are introduced at a temperature and pressure proximate said operating temperature and pressure, said organic matter and oxygen mixing and reacting as they flow downwardly to establish a first reaction zone in said outer reactor chamber, said reactor core having a static mixer vane arrangement along a majority of its length, splitting, rearranging and combining the aqueous suspension of organic matter and bubbles of oxygen-containing gas by said static mixer as they are circulated upwardly by said pump to react further said organic matter with said oxygen to establish a second reaction zone, and withdrawing treated aqueous suspension of organic matter and gases at a rate at least equal to the rate of said introduction of organic matter and gases.

7. A process of claim 6, wherein said upper region of said reactor core is above said second reaction zone, said process further comprising exposing upwardly moving organic matter and oxygen-containing gases to ultrasonic energy waves in said upper region of the reactor core to break up remaining organic matter and mix the broken up organic matter with the oxygen-containing gas bubbles to oxidize further said organic matter thereby forming a third reaction zone, recirculating at least a major portion of the material emerging from the upper end of said reactor core.

8. A process of claim 6, wherein said static mixer vanes have an external surface of a catalyst for oxidation reaction of said organic matter with said oxygen.

9. A process of claim 8, wherein said catalyst is selected from the group consisting of manganese/chromium/zinc, ammomium vanadate, copper oxide, nickel oxide, cobalt oxide, chromium oxide, cerium oxide, silver oxide; copper oxide/zinc oxide, copper oxide/chromium oxide/magnesium chromate and nickel oxide/nickel chromate.

10. A process of claim 6, wherein said elevated temperature and pressure is in the range of 200° C. to 370° C. and 35 to 210 kg/cm$^2$.

11. A process of claim 6, 7 or 9, wherein a plurality of said reactors are interconnected in series, said withdrawn treated aqueous suspension of organic matter and gases from an upstream reactor being introduced to said outer reactor chamber of a downstream reactor separately of a fresh supply of heated and pressurized oxygen-containing gas, and disposing of treated aqueous suspension of organic matter and gases withdrawn from the last of said plurality of reactors.

12. A process of claim 6, 7 or 9, wherein said treated aqueous suspension of organic matter and gases are withdrawn from the upper region of said outer reactor chamber above the area of said point of introduction of organic matter and oxygen-containing gas.

13. A process of claim 6, 7 or 9, wherein said treated aqueous suspension of organic matter and gases are withdrawn from the upper region of said outer reactor chamber above the area of said point of introduction of organic matter and oxygen-containing gas, inducing said treated aqueous suspension of organic matter and gases as they emerge from said reactor core to flow away from said reactor core to flow away from the region where such treated organic matter and gases are withdrawn.

14. A process of claim 6, 7 or 9, wherein said reactor is formed with a cylindrical reactor core and concentric outer annular reactor chamber, said pump being located adjacent the bottom of said reactor core for circulating said aqueous suspension of organic matter and gases downwardly of said annular reactor chamber and upwardly of said reactor core.

15. A process of claim 6, 7 or 9, wherein said reactor is operated on a continuous basis, introducing continuously untreated aqueous suspension of organic matter and oxygen-containing gas, the rate of introduction providing a residence time of such organic matter in said reactor sufficient to reduce the chemical oxygen demand of the organic matter to the desired level.

16. A process of claim 6, 7 or 9, wherein said reactor is operated on a batch basis, heating and pressurizing said reactor into the range of operating temperature and pressure and introducing a batch of aqueous suspension of organic matter and oxygen-containing gas proximate the operating temperature and pressure, continuously introducing oxygen-containing gas until the chemical oxygen demand of the organic matter has been reduced to said desired level.

* * * * *